P. LOEWEN.
HORSE RELEASER.
APPLICATION FILED MAR. 27, 1916.

1,203,370.   Patented Oct. 31, 1916.

Inventor
Peter Loewen
By Geo. P. Kimmel
Attorney

UNITED STATES PATENT OFFICE.

PETER LOEWEN, OF ROSENGARD, MANITOBA, CANADA.

HORSE-RELEASER.

1,203,370.  Specification of Letters Patent.  Patented Oct. 31, 1916.

Application filed March 27, 1916. Serial No. 87,032.

*To all whom it may concern:*

Be it known that I, PETER LOEWEN, a subject of Canada, residing at the village of Rosengard, Province of Manitoba, Canada, have invented certain new and useful Improvements in Horse-Releasers, of which the following is a specification.

The present invention relates to animal restraining devices, and more particularly to new and useful improvements in animal releasers.

An object of my invention is to provide in a compact and durable structure a simple and cheap device for restraining animals, so arranged as to permit easy release of a number of animals at a given time simultaneously.

Another object of my invention is to provide new and improved means for releasing the animals comprising stationary and movable jaw members operable by a rod, as well as improved means for locking the movable jaw in closed position.

Other objects and advantages to be derived from the provision of my improved animal releaser will appear from the following detail description and the claims taken with an inspection of the accompanying drawing, in which—

Figure 1:
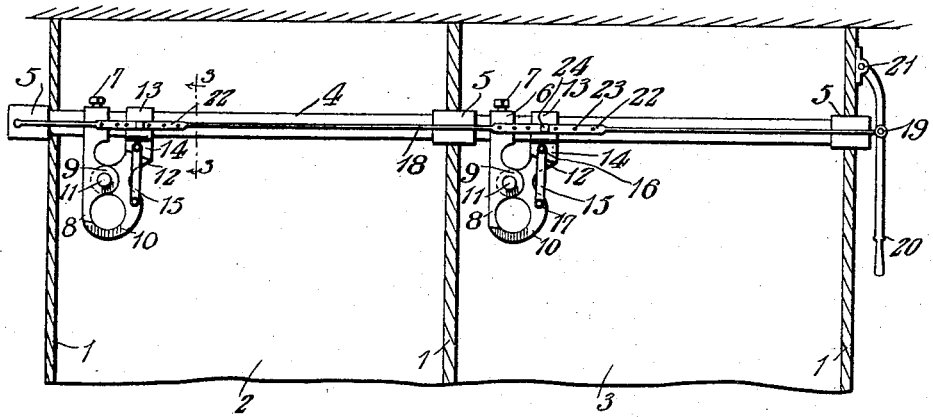
Figure 2:
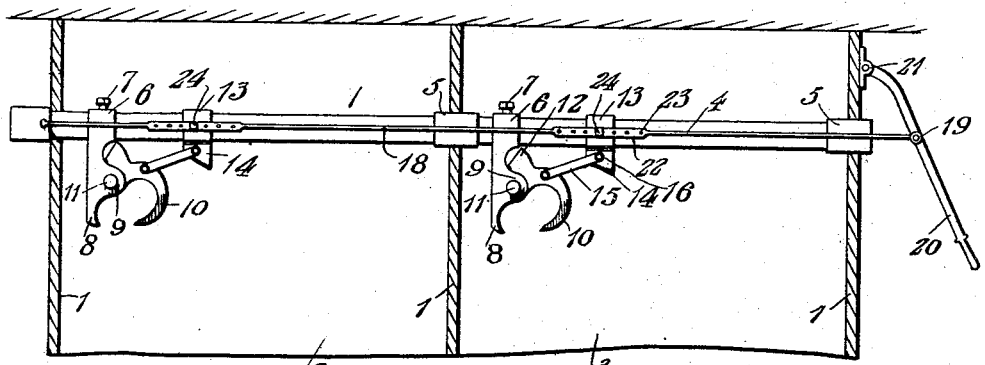
Figure 3:
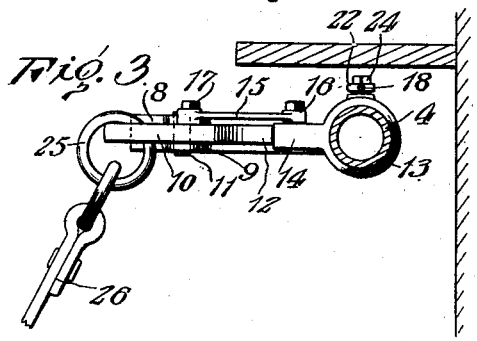

Figure 1 is a top plan view of an animal releaser embodying the improvements of my invention, the animal stalls being shown in section, and the releaser being in closed position, Fig. 2 is a similar view showing the releaser in open position, and Fig. 3 is a transverse sectional view taken on the line 3—3 of Fig. 1 looking in the direction of the arrow.

Referring more particularly to the drawings in which similar characters of reference designate like and corresponding parts throughout the various views, 1 designate the walls of a plurality of stalls, of which there are three shown, providing two stalls 2 and 3.

My invention comprises a tubular support 4 which may be formed in sections connected by couplings 5. Mounted on the support 4 are arranged the restraining devices of my invention which are identical in construction and therefore a description of one will suffice. The restraining device comprises a bracket 6 adjustably mounted on the support 4 by means of a set screw 7 having a stationary jaw 8. The jaw 8 is provided with an enlargement 9 on which is pivotally mounted a movable jaw 10 by means of the pin 11. The jaw 10 is provided on its rearward end with an extension 12 for a purpose which will hereinafter appear. I provide means for opening and closing jaw 10 which comprises a collar 13 slidably mounted on the support 4 and provided with a lateral lug 14 having a link 15 pivotally connected thereto as at 16, said link being pivotally connected at its free end as at 17 to the jaw 10. I provide means for sliding the collar 13 on the support 4 for opening and closing the jaw 10, said means including a rod 18 having the free end thereof pivotally connected as at 19 to a lever 20 pivotally mounted at 21 to the outer wall of the endmost stall. The rod 18 is flattened as at 22 and is provided with a plurality of openings 23, one of which is engaged with the bolt 24 carried by the collar 13. It will be seen that when the collar 13 is reciprocated on the support 4, the jaw 10 will be caused to slide into and out of closed position. When in closed position, as best shown in Fig. 1, the lug 14 engages the extension 13 and locks the jaw 10 against movement. A ring 25 carried by the end of a strap 26 is engaged by the jaw 10 as shown in Fig. 3.

Assuming that the device is in closed position as shown in Fig. 1, and it is desired to open a plurality of the devices simultaneously, the lever 20 is moved to the position shown in Fig. 2. This movement is transmitted to the collar 13 by means of the rod 18 moving said collar from the path of movement of the extension 12. When the collar 13 moves to its outermost position, the link 15 exerts a force on the jaw 10 moving the same to open position as shown in Fig. 2.

It will be seen that in the provision of the shoulder of the extension 12 and the lug 14, all lost motion when the jaws are closed is practically obviated preventing any possible slight opening of the jaw 10 when this is not desired.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as described.

What I claim as my invention and desire to secure by Letters Patent is:

1. In an animal releaser, a stationary support, a plurality of stationary jaws carried thereby, a plurality of movable jaws pivoted on first said jaws, a plurality of reciprocable collars on said support, links connecting said collars with said movable jaws, and shoulders on said collars for engagement with said jaws when closed to lock the same against movement.

2. In an animal releaser of the class described, a tubular support, brackets mounted thereon, jaws formed on said brackets, movable jaws pivoted on said jaws, operating collars slidably mounted on said support and connected to said movable jaws by means of links, and shoulders on said movable jaws and said collars for coöperation to prevent lost motion when in closed position.

3. In an animal releaser, a stationary support, a plurality of stationary jaws carried thereby, movable jaws pivotally carried by said stationary jaws, a plurality of operating members slidably mounted on said stationary support, links connecting said operating members with said movable jaws, and shoulders formed on said slidable operating members and said movable jaws adapted for engagement when the jaws are closed.

In testimony whereof I affix my signature hereto.

PETER LOEWEN.

Copies of this patent may be obtained for five cents each, by addressing the "Commissioner of Patents, Washington, D. C."